(12) United States Patent
Svore et al.

(10) Patent No.: US 8,935,258 B2
(45) Date of Patent: Jan. 13, 2015

(54) IDENTIFICATION OF SAMPLE DATA ITEMS FOR RE-JUDGING

(75) Inventors: Krysta M. Svore, Seattle, WA (US); Elbio Renato Torres Abib, Redmond, WA (US); Christopher J. C. Burges, Bellevue, WA (US); Bhuvan Middha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

(21) Appl. No.: 12/484,256

(22) Filed: Jun. 15, 2009

(65) Prior Publication Data

US 2010/0318540 A1 Dec. 16, 2010

(51) Int. Cl.
*G06F 17/30* (2006.01)
*G06K 9/62* (2006.01)

(52) U.S. Cl.
CPC ........ *G06F 17/30864* (2013.01); *G06K 9/6257* (2013.01)
USPC .............................. 707/748; 707/723; 706/16

(58) Field of Classification Search
USPC .................... 707/999.005, 723, 748, 999.007; 706/20, 16
See application file for complete search history.

(56) References Cited

U.S. PATENT DOCUMENTS

| | | | |
|---|---|---|---|
| 5,649,070 A * | 7/1997 | Connell et al. ................. | 706/14 |
| 6,725,259 B1 | 4/2004 | Bharat | |
| 7,113,896 B2 * | 9/2006 | Zhang et al. .................... | 703/2 |
| 7,287,012 B2 | 10/2007 | Corston et al. | |
| 7,444,308 B2 * | 10/2008 | Guyon et al. ................... | 706/12 |
| 7,472,096 B2 | 12/2008 | Burges et al. | |
| 7,689,615 B2 * | 3/2010 | Burges et al. ................. | 707/723 |
| 7,958,063 B2 * | 6/2011 | Long et al. .................... | 706/12 |
| 8,255,412 B2 * | 8/2012 | Gao et al. ..................... | 707/765 |
| 8,265,416 B2 * | 9/2012 | Lin et al. ...................... | 382/266 |
| 8,332,411 B2 * | 12/2012 | Burges et al. ................. | 707/748 |
| 2003/0055615 A1 * | 3/2003 | Zhang et al. .................... | 703/2 |
| 2003/0160802 A1 * | 8/2003 | Srinidhi et al. ............... | 345/619 |
| 2004/0234136 A1 * | 11/2004 | Zhu et al. ...................... | 382/224 |
| 2005/0209785 A1 * | 9/2005 | Wells et al. .................... | 702/19 |
| 2006/0195440 A1 * | 8/2006 | Burges et al. .................... | 707/5 |
| 2006/0218110 A1 * | 9/2006 | Simske et al. ................. | 706/45 |
| 2006/0265747 A1 * | 11/2006 | Judge ............................. | 726/22 |
| 2007/0239632 A1 * | 10/2007 | Burges et al. .................. | 706/15 |
| 2008/0027925 A1 | 1/2008 | Li et al. | |

(Continued)

OTHER PUBLICATIONS

Brodley et al., "Identifying Mislabeled Training Data", in Journal of Artificial Intelligence Research 11 (1999), pp. 131-167, 1999.*

(Continued)

*Primary Examiner* — Phuong Thao Cao
(74) *Attorney, Agent, or Firm* — Sula Miia; Doug Barker; Micky Minhas

(57) ABSTRACT

Described is a technology for identifying sample data items (e.g., documents corresponding to query-URL pairs) having the greatest likelihood of being mislabeled when previously judged, and selecting those data items for re-judging. In one aspect, lambda gradient scores (information associated with ranked sample data items that indicates a relative direction and how "strongly" to move each data item for lowering a ranking cost) are summed for pairs of sample data items to compute re-judgment scores for each of those sample data items. The re-judgment scores indicate a relative likelihood of mislabeling. Once the selected sample data items are re-judged, a new training set is available, whereby a new ranker may be trained.

20 Claims, 3 Drawing Sheets

(56) References Cited

U.S. PATENT DOCUMENTS

| | | |
|---|---|---|
| 2008/0059508 A1 | 3/2008 | Lu et al. |
| 2008/0103996 A1* | 5/2008 | Forman et al. .................. 706/12 |
| 2008/0172375 A1* | 7/2008 | Burges et al. ..................... 707/5 |
| 2008/0270376 A1 | 10/2008 | Svore et al. |
| 2008/0320014 A1* | 12/2008 | Chu et al. ...................... 707/100 |
| 2009/0006360 A1 | 1/2009 | Liao et al. |
| 2009/0024607 A1 | 1/2009 | Sun et al. |
| 2009/0070095 A1* | 3/2009 | Gao ................................. 704/2 |
| 2009/0106232 A1* | 4/2009 | Burges et al. ..................... 707/5 |
| 2009/0248657 A1* | 10/2009 | Chellapilla et al. ............... 707/5 |
| 2010/0082614 A1* | 4/2010 | Yang et al. .................... 707/726 |
| 2010/0134496 A1* | 6/2010 | Bhaskaran et al. ........... 345/428 |
| 2010/0241598 A1* | 9/2010 | Yuta ................................ 706/12 |
| 2011/0137841 A1* | 6/2011 | Yuta ................................ 706/20 |

OTHER PUBLICATIONS

Burges, et al."Learning to Rank with Nonsmooth Cost Functions", Retrieved at<<http://research.microsoft.com/en-us/um/people/cburges/papers/lambdarank.pdf>>, pp. 8, in NIPS, 2006.

Li, et al."McRank: Learning to Rank Using Multiple Classification and Gradient Boosting", Retrieved at<<http://books.nips.cc/papers/files/nips20/NIPS2007_0845.pdf>>, pp. 8, in NIPS, 2007.

Burges, et al."Learning to Rank using Gradient Descent", Retrieved at<<http://research.microsoft.com/en-us/um/people/cburges/papers/icml_ranking.pdf>>, pp. 8, in ICML, 2005.

* cited by examiner

IDENTIFICATION OF SAMPLE DATA ITEMS FOR RE-JUDGING

BACKGROUND

Various types of data have a judgment label associated with data item. For example, query-URL pairs are labeled with relevance data by human judges that indicate how relevant the URL (document) is to that query. The labeled data may then be used in training web search ranking models. In general, the better the labeling, the better the ranking model.

From time to time such data needs to be re-judged with respect to how it is labeled. For example, URL documents and content change over time, and a fresh judgment needs to be made every so often so as to re-label that document when appropriate. However, re-judging/relabeling operations are expensive, as it involves significant amounts of data being judged by human judges in order to obtain enough labeled data (to perform practical training, for example).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which lambda gradient scores (information associated with ranked sample data items that indicates a relative direction and how "strongly" to move each data item for lowering a ranking cost) of sample data items are used to compute re-judgment scores for those sample data items. Those with the highest re-judgment scores (indicating a greater likelihood of mislabeling) are selected for re-judging. In this manner, only the most likely mislabeled sample data items are selected for re-judging. In one aspect, the sample data items are documents corresponding to query-URL pairs.

The lambda gradient scores may be obtained by providing the sample data to a ranker. Once the re-judgment scores are computed and the sample data items selected for re-judging, the re-judged data items may become part of a new training set. A new ranker may be built from the new training set.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards identifying labeled data samples, such as documents, that need human or automatic re-judging. In one implementation, this identification is performed by computing a "re-judgment" score based on the lambda-gradients (where lambda-gradients are generally described below and in United States patent application publication number 20090106232, assigned to the assignee of the present invention and hereby incorporated by reference).

It should be understood that any of the examples herein are non-limiting. Indeed, while query-URL pairs are used as one example of data re-labeled for LambdaRank or RankNet net training, the identification of data for re-labeling technology described herein may be used for labeled data other than query-URL pairs. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and search technology in general.

Figure 1:
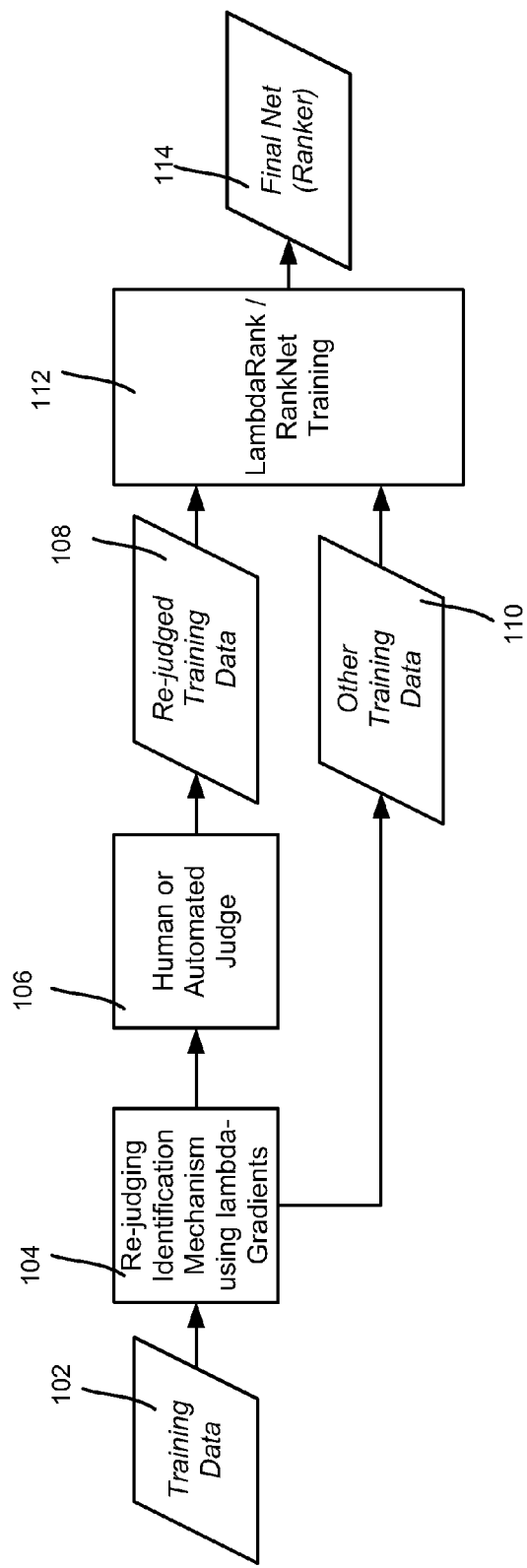
FIG. 1 is a block diagram representing example components for selecting sample data items for re-judging based on lambda gradient scores, and using the re-judged sample data items to train a new ranker.

Turning to FIG. 1, there is shown a block diagram representing example components for identifying which data samples of training data 102 need to be re-judged. To this end, a re-judging identification mechanism 104 that obtains and uses the lambda gradient scores evaluates the data samples. Those samples that are determined to need re-judging (those with the highest lambda gradient scores) are provided to a human and/or automated judge 106, where they are re-labeled into re-judged training data 108.

For scenarios in which the training data comprises query-URL pairs, the re-judged training data 108, along with other training data 110 (e.g., that did not need to be re-judged) may be used in LambdaRank or RankNet training 112 to provide a final net 114. For example, with LambdaRank, training data is a set of input/output pairs (x, y); x is a feature vector extracted from a query-document pair. The y value is a human-judged relevance score, e.g., 0 to 4, with 4 as the most relevant.

LambdaRank is a neural net ranker that maps a feature vector x to a real value y that indicates the relevance of the document given the query (relevance score). For example, a linear LambdaRank maps x to y with a learned weight vector w such that $y = w \cdot x$. Typically, w is optimized with respect to a cost function using numerical methods if the cost function is smooth and its gradient with respect to w can be computed. In order for the ranking model to achieve the best performance in document retrieval, the cost function used during training should be the same as, or as close as possible to, the measure used to assess the final quality of the system. The quality of the ranker may be discerned using any suitable information retrieval metric method, such as Normalized Discounted Cumulative Gain (NDCG), Mean Average Precision (MAP), Mean Reciprocal Rank (MRR), Q-measure, generalized average precision and the like.

As described in the aforementioned United States patent application publication number 20090106232, a lambda gradient score is information associated with a data item that can indicate a direction an item should be moved in a ranked list of items, and how "strongly" the item should be moved (its "gain"), to reduce a cost of the item, wherein cost can be determined using any suitable cost function. For example, a lambda gradient score may be estimated based upon pair-wise ranking data of two items in the training data 102, and can also take into account scores of other items. A cost may be estimated (e.g., an NDCG cost) based at least in part upon the pair-wise ranking data and the other scores.

The pair-wise ranking data may indicate which item of two items should be ranked higher than the other. Other ranking scores assigned to the same two items can also be used to determine which of the two items should be ranked higher than the other. Thus, if the training data 102 indicates that a first item should be ranked higher than the second item and the scores indicate that the first item should be ranked higher than the second item, the cost for the pair of items is relatively low. However, if the training data 104 indicates that the first item should be ranked higher than the second item but the other ranking indicate that the second item should be ranked higher than the first item, then a higher cost is determined.

Moreover, cross entropy may be analyzed, which is a measurement of a distribution of the training data 102 as indicated therein (e.g., whether a first item should be ranked higher than a second item) and a measurement of the distribution of ranking scores. Further, a change in an indication of quality (as determined by a suitable metric, such as NDCG) may be analyzed if the position of two documents at issue are changed. The estimated gradient of cost can be determined by analyzing the change in these two aspects (cross entropy and NDCG or other suitable metric) when parameters are changed.

Turning to computation of the re-judgment scores, once the lambdas are known for the training data samples, they may be used to determine which samples need to be re-judged. In general, this is based on larger lambda gradient scores indicating the likelihood that a document is incorrectly labeled.

Figure 2:
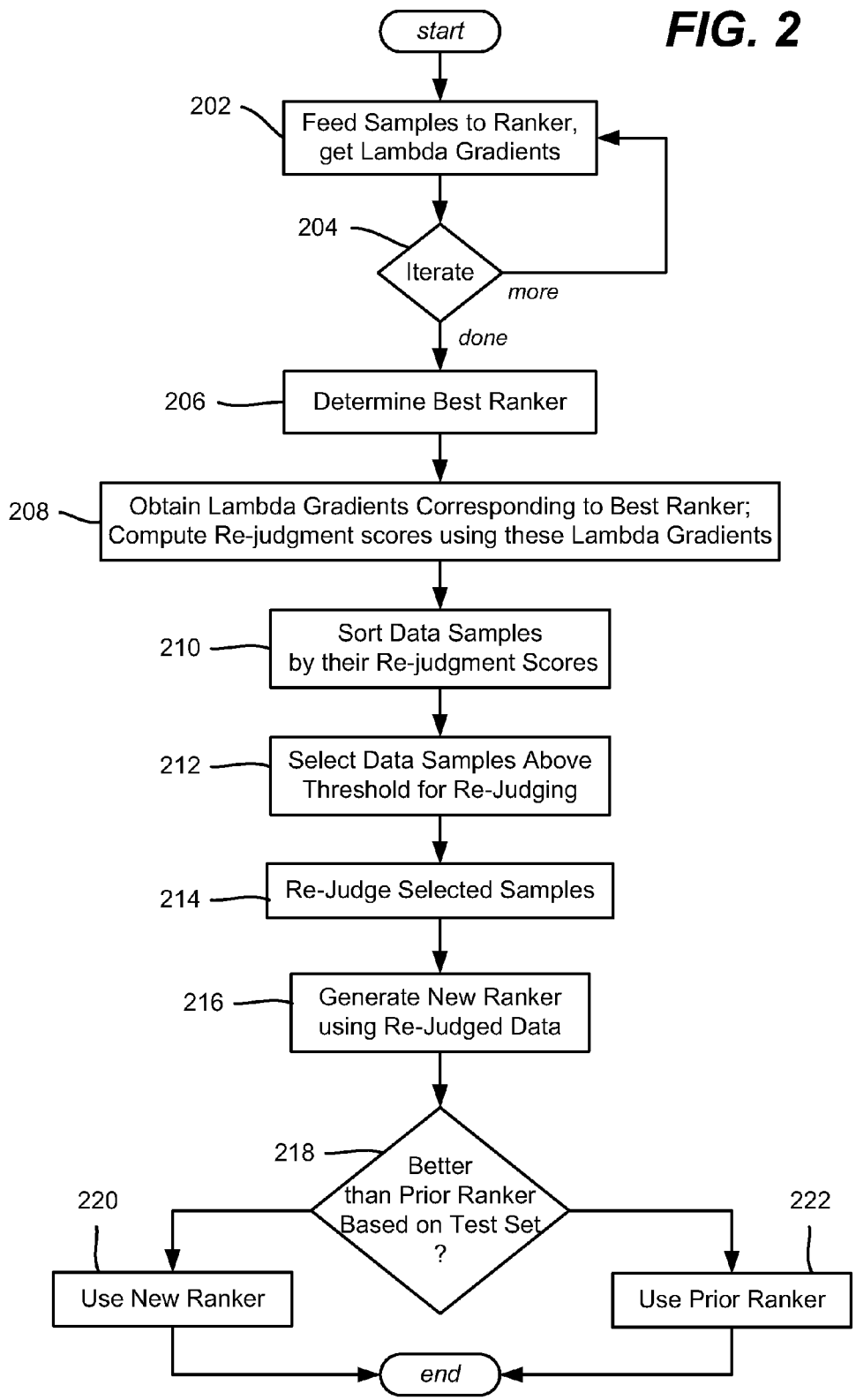
FIG. 2 is a flow diagram showing example steps for selecting sample data items for re-judging based on lambda gradient scores, and using the re-judged sample data items to train and evaluate a new ranker.

FIG. 2 is a flow diagram showing an overall process for determining which data samples to re-judge. Step 202 feeds the various samples to a ranker (e.g., incorporated into the re-judging identification mechanism 104) that provides the lambda gradient scores in a known manner. Step 204 represents the repeated iterations (e.g., on the order of hundreds) that continually adjust the lambda gradient scores.

As is known, the lambda gradient scores tend to decrease as the ranker improves over the iterations, although as noted herein, mislabeled samples still tend to have larger lambda gradient scores. However, after time, the iterations tend to over-fit the parameters, whereby the rankers get worse. Thus, step 206 represents selecting the best ranker, in a known manner. Normally, this is how a ranker is trained for use in actual ranking.

In this technology however, the best ranker is not used at this time. Rather, the data samples' lambda gradient scores corresponding to this best ranker are leveraged. Step 208 represents obtaining these lambda gradient scores, and using them to compute the re-judgment scores, as described below. Step 210 represents sorting the data samples by the re-judgment scores.

Step 212 selects the data samples with the highest re-judgment scores. A user provided threshold or default may be used as the cutoff, e.g., the top (worst) N percent of the samples based on having the highest re-judgment scores are selected for re-judging. In this manner, rather than having to re-judge all samples, a user controls how many samples will be re-judged, with those that are re-judged being the ones that are most likely mislabeled.

Step 214 represents the re-judging. With the newly re-judged samples, some of the data samples will have different labels, whereby different training data is now available. This new training data is used at step 216 to train a new ranker in a known manner.

However, it is possible that the new ranker is worse than the prior ranker. For example, overall the judges may have made the training data worse by mislabeling even more samples than before. Thus, step 218 represents evaluating the new ranker against a known test set of data to see how the new ranker performs. If better, the new ranker is kept (step 220), otherwise the prior ranker is kept (step 222).

By way of an example of computing the re-judgment scores using documents, consider all pairs of documents (i,j), where pairs are constructed between documents and the labels are different, that is, $l(i) \ne l(j)$, where $l(i)$ indicates the label of document i. Note that pairs are only constructed between documents belonging to the same query.

Let $p(i)$ indicate the position of document i according to a production ranker, beginning with the top document d having $p(d)=1$. Thus $p(i) \in \{1, \ldots, n\}$ where n is the number of documents for the query.

The mechanism 104 produces the re-judgment score for each document i, which is denoted by $r(i)$. Those documents with the highest scores are then re-judged.

Consider a pair i,j. The mechanism 104 computes $r(i)$ as follows. Let $o_{ij}=s_i-s_j$; assume if $l(i)>l(j)$, then $S_{ij}=1$, else $S_{ij}=-1$. $S_{ij}$ represents the sign of the lambda gradient.

$$r(i) = \left| \sum_j \lambda_{ij} \right|$$

$$\lambda_{ij} = S_{ij} \left| \left( \frac{1}{\max DCG} \right) \left( \frac{\partial C}{\partial o_{ij}} \right) (\text{gain}[l(i)] - \text{gain}[l(j)]) \right.$$
$$\left. (\text{discount}(p(i)) - \text{discount}(p(j))) \right|$$

$$\text{where} \left( \frac{\partial C}{\partial o_{ij}} \right)$$

is the cost function.

For MAP and MRR lambda gradients, it is assumed that documents i and j are misranked, so that $l(i)>l(j)$, but $p(i)>p(j)$.

MAP:

$$\lambda_{ij} = \left| \frac{1}{R} \left( \frac{1}{1+e^{o_{ij}}} \right) \left( \frac{n+1}{p(j)} - \frac{m}{p(i)} + \sum_{k=p(j)+1}^{p(i)-1} \frac{l(k)}{k} \right) \right|$$

where R is the number of relevant documents for that query, n,m, (n≤m) are the number of relevant documents at the top $r_j$ and the top $r_i$ positions, respectively.

MRR:

$$\lambda_{ij} = \left| \Delta RR(p(i), p(j)) \left( \frac{1}{1+e^{o_{ij}}} \right) \right|$$

$$\text{where } \Delta RR(p(i), p(j)) = \begin{cases} \frac{1}{p(j)} - \frac{1}{p} & \text{if } p(j) < p \le p(i) \\ 0 & \text{otherwise} \end{cases}$$

and where p is the position of the top ranked document in the ranked list.

In one implementation, the mechanism 104 sets:

$$\text{discount}(p(*)) = \frac{1}{\log(p(*)+1)}$$

Inserting the derivative of the cross-entropy cost function obtains:

$$\lambda_{ij} = S_{ij} \left| \begin{array}{c} \left(\dfrac{1}{\max DCG}\right)(\text{gain}[l(i)] - \text{gain}[l(j)]) \\ (\text{discount}(p(i)) - \text{discount}(p(j))\left(\dfrac{1}{1+e^{S_{ij}o_{ij}}}\right) \end{array} \right|$$

$$l(*) \in \{0, 1, 2, 3, 4\}$$
$$p(*) \in \{1, \ldots, n\}$$
$$\text{gain}(*) = [0, 3, 7, 15, 31]$$

The training samples are then sorted by each one's re-judgment score r. Those documents having a score above a user-selectable threshold are re-judged. Note that there are various alternatives/variations to the cross-entropy cost function that can be used to obtain similar calculations for the λ-gradients.

Other variations also may be used. For example, the scores may be based on DCG rather than NDCG, giving:

$$\lambda_{ij} = S_{ij} \left| \begin{array}{c} \left(\dfrac{\partial C}{\partial o_{ij}}\right)(\text{gain}[l(i)] - \text{gain}[l(j)]) \\ (\text{discount}(p(i)) - \text{discount}(p(j))) \end{array} \right|$$

Further, the mechanism 104 may consider that the λ-gradients indicate a kind of measure of the importance of the document, even when they are subtracted. Then, instead of subtracting off the gradients when the label is of lower relevance than the other document in the pair, the mechanism 104 may instead add every λ together giving $$r(i) = \sum_j |\lambda_{ij}|$$

Note that with these variations, the lambdas are not the same as used in the actual ranking algorithm. Using the same lambdas as in the training algorithm may help identify the documents that are most influential.

When training using RankNet, re-judgment is based on $$\lambda_{ij} = \left(\dfrac{1}{1+e^{S_{ij}o_{ij}}}\right) = \left(\dfrac{\partial C}{\partial o_{ij}}\right)$$

Exemplary Operating Environment

Figure 3:
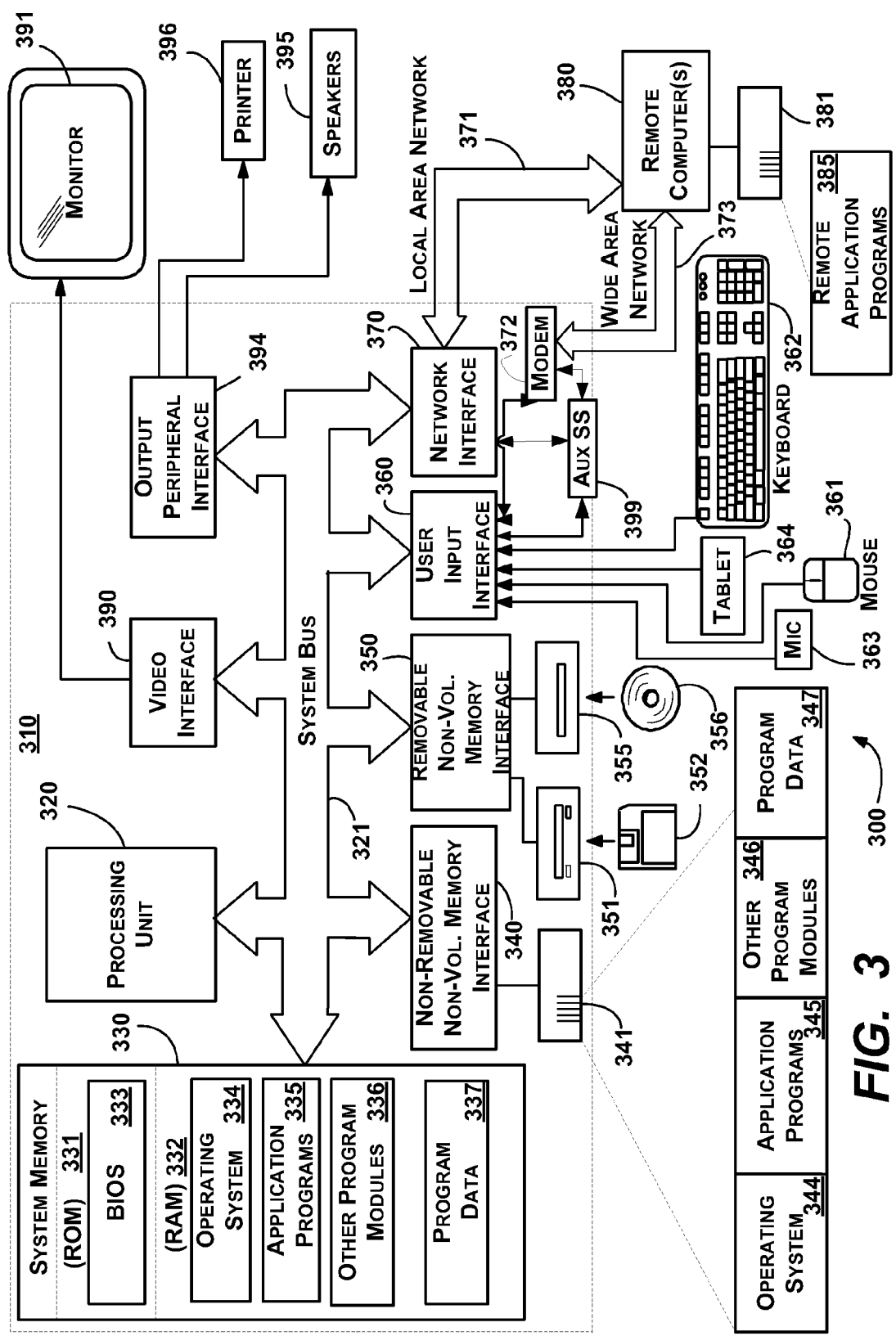
FIG. 3 shows an illustrative example of a computing environment into which various aspects of the present invention may be incorporated.

FIG. 3 illustrates an example of a suitable computing and networking environment 300 into which the examples and implementations of any of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during startup, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, employing at least one processor to perform steps comprising:
   obtaining lambda gradient scores for pairs of ranked sample data items;
   using the lambda gradient scores to compute re-judgment scores for the ranked sample data items, wherein each lambda gradient score includes a ranking cost for a pair of ranked sample data items; and
   selecting one or more ranked sample data items of the ranked sample data items for relabeling based upon a re-judgment score associated with each ranked sample data item, wherein the re-judgment score indicates a likelihood of mislabeling a corresponding ranked sampled data item.

2. The method of claim 1 wherein obtaining the lambda gradient scores comprises training a plurality of rankers, determining a best ranker of the plurality of rankers, and using the lambda gradient scores associated with that best ranker to compute the re-judgment scores.

3. The method of claim 2 wherein training the plurality of rankers comprises using LambdaRank training.

4. The method of claim 2 wherein training the plurality of rankers comprises using RankNet training.

5. The method of claim 1 wherein selecting the one or more ranked sample data items for relabeling comprises sorting the ranked sample data items based upon their re-judgment scores.

6. The method of claim 1 wherein selecting the one or more ranked sample data items for relabeling comprises applying a user-provided threshold to select a subset of the ranked sample data items based upon their re-judgment scores.

7. The method of claim 1 wherein obtaining the lambda gradient scores for the pairs of ranked sample data items comprises using a normalized discounted cumulative gain cost function.

8. The method of claim 1 wherein obtaining the lambda gradient scores for the pairs of ranked sample data items comprises using a discounted cumulative gain cost function, a mean average precision cost function, a mean reciprocal rank cost function, a Q-measure cost function or a generalized average precision cost function.

9. The method of claim 1 wherein using the lambda gradient scores to compute re-judgment scores for the ranked sample data items comprises summing lambda gradient scores associated with corresponding pairs of ranked sample data items.

10. The method of claim 1 wherein using the lambda gradient scores to compute re-judgment scores for the ranked sample data items comprises summing absolute values of lambda gradient scores associated with corresponding pairs of ranked sample data items.

11. The method of claim 1 wherein the selected one or more ranked sample data items are re-judged to provide new training data, and further comprising, generating a new ranker using the re-judged one or more ranked sample data items.

12. The method of claim 11 further comprising determining whether to use the new ranker based on evaluating the new ranker against a test set.

13. In a computing environment, a system comprising, at least one processor, and a memory communicatively coupled to the at least one processor and including components comprising:
a re-judging identification mechanism configured to compute re-judgment scores for ranked sample data items based upon lambda gradient scores for pairs of the ranked sample data items and select ranked sample data items to re-judge based upon the re-judgment scores, wherein each lambda gradient score includes a ranking cost for a pair of ranked sample data items, wherein each re-judgment score associated with a ranked sample data item indicates a likelihood of mislabeling that ranked sample data item; and
a ranker training mechanism configured to train a ranker based upon a training set that includes the selected ranked sample data items that were re-judged, wherein after re-judging, at least one of the selected ranked sample data items has a different label.

14. The system of claim 13 wherein the ranker training mechanism is based on LambdaRank training.

15. The system of claim 13 wherein the ranker training mechanism is based on RankNet training.

16. The system of claim 13 wherein the ranked sample data items comprise relevant documents corresponding to a query, and wherein the re-judging identification mechanism is further configured to compute the re-judgment scores by summing lambda gradient scores associated with corresponding pairs of documents.

17. One or more computer-readable storage devices having computer-executable instructions, which when executed perform steps, comprising:
computing re-judgment scores for documents, including by summing signed lambda gradient scores for pairs of documents in a ranked list of relevant documents corresponding to a query, wherein each signed lambda gradient score includes a ranking cost for a pair of relevant documents, wherein each re-judgment score associated with a document indicates a likelihood of mislabeling that document; and
selecting documents for re-judging, from the ranked list, based upon a re-judgment score associated with each document in which the selected documents for re-judging are mislabeled.

18. The one or more computer-readable storage devices of claim 17 wherein selecting the documents for re-judging comprises sorting the documents in the ranked list of relevant documents based upon their re-judgment scores, and applying a user-provided threshold to select a subset of the documents in the ranked list of relevant documents based upon their sort order.

19. The one or more computer-readable storage devices of claim 17 wherein the selected documents are re-judged to provide new training data, and having further computer-executable instructions comprising, generating a new ranker using the re-judged documents.

20. The one or more computer-readable storage devices of claim 19 having further computer-executable instructions comprising, determining whether to use the new ranker based on evaluating the new ranker against a test set.

* * * * *